W. G. JAMES.
Oven Plate.

No. 111,850. Patented Feb. 14, 1871.

Witnesses:
John M. Stoops
C. L. Ewert

Inventor:
W. G. James
per Alexander Mason
Attys.

United States Patent Office.

W. G. JAMES, OF RICHLAND CENTRE, WISCONSIN.

Letters Patent No. 111,850, dated February 14, 1871.

IMPROVEMENT IN STOVE-OVEN GRATES.

The Schedule referred to in these Letters Patent and making part of the same.

*To all whom it may concern:*

Be it known that I, W. G. JAMES, of Richland Centre, in the county of Richland and in the State of Wisconsin, have invented certain new and useful Improvements in a Stove-oven Grate or supplement bottom; and do hereby declare that the following is a full, clear, and exact description thereof, reference being had to the accompanying drawing and to the letters of reference marked thereon making a part of this specification.

The nature of my invention consists in the construction of a sheet-iron plate to be inserted in the oven of a stove for the purpose of breaking the heat either from the bottom or top when the heat is too great.

In order to enable others skilled in the art to which my invention appertains to make and use the same, I will now proceed to describe its construction and operation, referring to the annexed drawing, in which—

Figure 1:
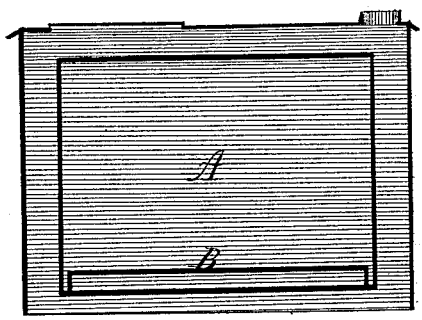
Figure 2:
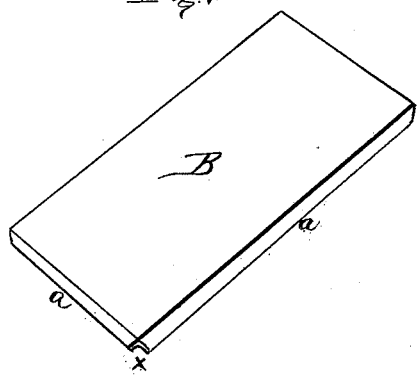

Figure 1 is a vertical section of a stove-oven with my supplemental plate in the bottom thereof; and Figure 2 is a perspective view of the plate.

A represents the oven of a stove, and

B is the supplemental plate placed in the bottom thereof.

This plate is made of sheet-iron, of the same size as the bottom of the oven, and has its edges turned down all around, the corners, however, being cut off or left open for the passage of the heat.

In some stoves the heat is entirely too great in the bottom of the oven. This plate, placed in the bottom, breaks the heat, and, so to say, regulates it so that it will be uniform.

In other stoves the heat is greatest at the top of the oven, and in this case the plate is turned upside down, the edges on the under side of the top, and ledges or flanges along the sides of the oven, upon which the plate rests.

I am aware that a perforated plate in the bottom of a stove has been used; but such plate admits too much of the heat, while my plate, being solid, and the heat having no escape except at the corners of the plate, renders the temperature of the oven more uniform.

My invention is especially applicable to stoves where the bottoms of the ovens are cracked, and prevents the smoke from coming up and impregnating the food which is being cooked.

What I claim is—

As a new article of manufacture, the within-described oven-plate, made of a single piece of solid sheet metal, with its ends and sides *a a* turned down, and with openings *x* at each corner to allow the heat to pass upward, all as shown and described.

In testimony that I claim the foregoing I have hereunto set my hand this 31st day of December, 1869.

W. G. JAMES.

Witnesses:
O. F. BLACK,
W. S. BLACK.